A. WALTON.
SPEED CONTROLLING DEVICE.
APPLICATION FILED MAR. 20, 1911.
1,144,012.
Patented June 22, 1915.
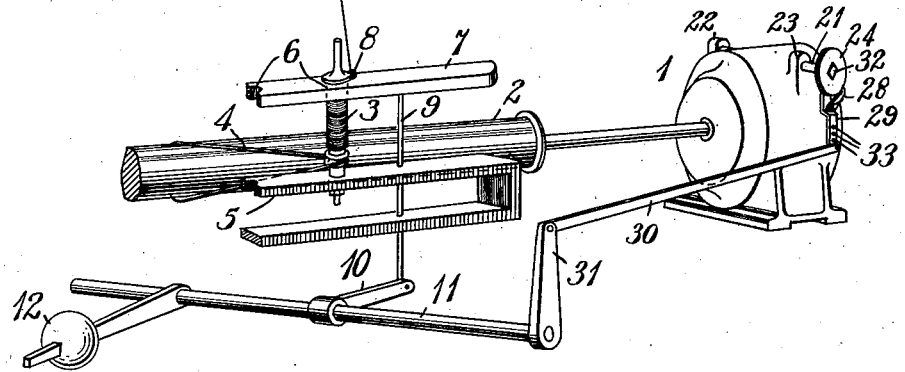
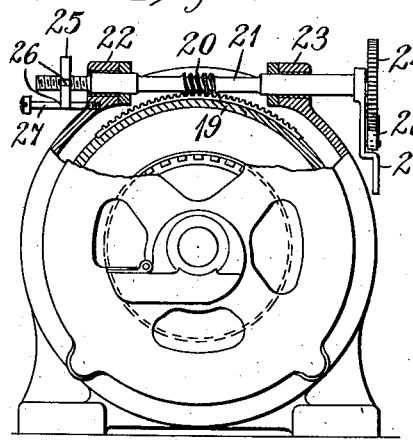
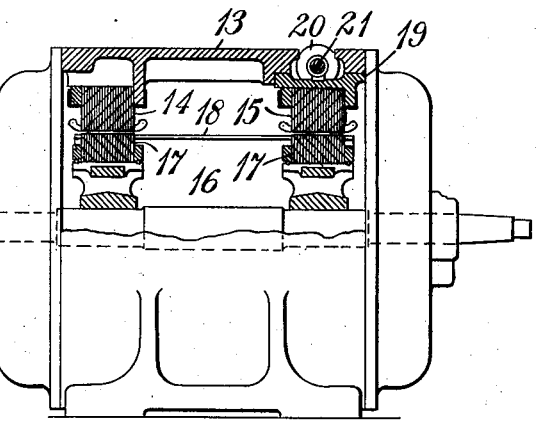
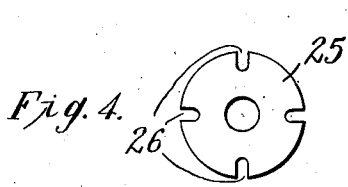
WITNESSES:
Fred H. Miller
D. H. Mace
INVENTOR
Albert Walton
BY
Wesley G. Carr
ATTORNEY

UNITED STATES PATENT OFFICE.

ALBERT WALTON, OF BOSTON, MASSACHUSETTS, ASSIGNOR TO WESTINGHOUSE ELECTRIC AND MANUFACTURING COMPANY, A CORPORATION OF PENNSYLVANIA.

SPEED-CONTROLLING DEVICE.

1,144,012.   Specification of Letters Patent.   Patented June 22, 1915.

Application filed March 20, 1911. Serial No. 615,497.

*To all whom it may concern:*

Be it known that I, ALBERT WALTON, a citizen of the United States, and a resident of Boston, in the county of Suffolk and State of Massachusetts, have invented a new and useful Improvement in Speed-Controlling Devices, of which the following is a specification.

My invention relates to adjustable stops for automatic speed-controlling devices, and it has special reference to electrically operated spinning and twisting machinery.

The object of my invention is to provide a device of the above indicated class which shall be simple and inexpensive in construction, effective and reliable in operation, and particularly adapted for use in spinning machinery, where it is essential that each cycle of operation shall start at a predetermined speed.

It is common practice, in the art of spinning, to provide means whereby the speed of rotation of the spindles is gradually increased during the process, as the diameter of the cop is increased.

Numerous methods and devices have been employed to effect the desired result, among which have been the use of a peculiar type of induction motor, having a single rotor and two relatively movable stators, for the purpose of speed regulation.

When both stator windings bear the same relation to the common rotor winding, the potentials induced therein are of like phase and produce a maximum secondary voltage. However, if one of the stator windings be displaced with respect to the other, the potentials in the rotor winding are out of phase, which results in a reduction of secondary voltage and thereby causes a consequent increase in slip and a reduction in speed.

In the commercial application of this type of induction motor to spinning work, it has been customary to provide means for automatically rotating the movable stator step by step from a predetermined initial out-of-phase position, to a position in which the two stator windings occupy the same inductive relation with the rotor winding, thus effecting a gradual increase in the speed of rotation of the spindles as the cop builds up.

In actual service, after each frame of spindles has been wound up, the operation is discontinued; the spindles are removed and new ones replaced; the movable stator is turned back to its initial slow speed position; and the operation is again repeated.

Past experience has demonstrated the fact that a proper speed of rotation is one of the requisites to successful spinning, as the yarn must be maintained under a definite tension in order to reduce the number of breakages. It is, therefore, essential that each cycle of operation be started at a predetermined speed, and, for this purpose, suitable stops are provided upon the motor frame, in order that the relation of the two stator windings shall always be alike at starting, thereby determining the speed of operation. However, as similar motors are rarely identical in electrical performance, and, inasmuch as weather conditions and the physical properties of the yarn itself, determine the best operating speed, it becomes necessary to provide a stop having a considerable element of adjustability, in order that the motors may be adjusted for any predetermined speed of operation under varying conditions.

According to my invention, I provide an adjustable stop, preferably comprising a notched nut, adapted to float upon a threaded shaft, intermittent rotation of which is effected by a suitable pawl and ratchet mechanism. A worm member is mounted upon the shaft and actuates a gear segment which is secured to the movable stator of the driving motor. The nut may be adjusted to any desired position upon the shaft and is prevented from turning by means of a screw which engages one of the notches in the periphery of the nut and is screwed into the motor frame.

As the movable stator is turned back, after each cycle of operation, the nut gradually travels along the shaft until it engages the motor frame and restricts further movement. It is evident, therefore, that the stop may be adjusted to fix the initial speed of each cycle of operation to any desired value, in accordance with operating conditions.

My invention may best be understood by reference to the accompanying drawing, in which—

Figure 1 is a diagrammatic view of a portion of the working parts of a common form of spinning machine embodying my invention. Figs. 2 and 3 are, respectively, a view, partially in end elevation and partially in vertical section, and a view, partially in side elevation and partially in vertical section, of a dynamo-electric machine which embodies my invention. Fig. 4 is a detail face view of the floating nut shown in Fig. 2.

Referring to the drawings in detail, a dynamo-electric machine 1 is direct connected to a drum shaft 2, from which a plurality of cops or spindles 3 (only one of which is shown) are operated in the usual manner by means of suitable belts 4. Each spindle 3 is rotatably mounted upon a fixed rail 5 and projects upwardly through an opening 6 in a ring rail 7 having an eye or guiding member 8 through which the yarn is threaded, as it is wound upon the spindle.

The ring rail 7 is supported upon a plurality of rods 9 (only one being shown) which are pivotally connected to the outer ends of rocker arms 10. The rocker arms 10 are rigidly fastened to an operating shaft 11 which is turned slowly back and forth, according to well known practice, for the purpose of imparting a rising and falling movement to the ring rail 7. A counterweight 12 is secured to the operating shaft 11, in order to maintain a smooth and balanced operation of the ring rail 7.

The construction of the dynamo-electric machine 1, and its operation for purposes of speed adjustment, is old and familiar in the art, said machine comprising essentially, a motor frame 13, two stators 14 and 15 and a single rotor 16. The rotor 16 comprises two end core members 17 and a plurality of conducting bars 18 secured thereto in inductive relation to the stators 14 and 15.

The stator 15 is rotatably mounted in the motor frame 13 and may be moved through a considerable arc by means of a worm wheel segment 19 which is secured thereto and a coöperating worm 20 which is mounted upon a shaft 21. The shaft 21 is mounted in integral projecting portions 22 and 23 of the motor frame 13, one end of said shaft being provided with a ratchet wheel 24. The other end of the shaft 21 is threaded and carries a floating nut 25 having a plurality of notches 26 in its periphery to receive a set screw 27 which is screwed into the motor frame.

A pawl 28 is pivotally secured to a suspended lever 29 which is fastened to the shaft 21 and is adapted to coöperate with the ratchet wheel 24 in a well known manner. The lower end of lever 29 is pivotally connected to a connecting rod 30, the other end of which is also pivotally associated with the end of a rocker arm 31, which has a rigid connection to the operating shaft 11.

A rectangular recess 32 is provided in one end of the shaft 21 to receive a portion of a suitable handle (not shown), by means of which the movable stator 15 may be operated by hand if desired. Several holes 33 are provided in the lower end of the lever 29 for the purpose of adjusting the connection of the rod 30 to said lever in order to vary the operative relationship of the pawl 28 to the ratchet wheel 24, as will be readily understood.

The operation of the apparatus is as follows: Having decided upon the initial speed of operation of the spindles 3, as determined by the existing operating conditions, the position of the movable stator 15 is adjusted with respect to the stator 14 until the desired speed is obtained. The floating nut 25 is then screwed up into engagement with the projecting portion 22 of the motor frame and is locked in position by means of the set screw 27 which engages one of the notches 26. The spinning process may now be started, and, by reason of the rising and falling movement of the ring rail 7, the yarn is wound upon the spindles 3 in successive layers. It will be observed that, at each downward movement of the ring rail 7, the stator 15 is given a slight rotative movement, through the agency of the worm and gear mechanism, the pawl and ratchet device and the connecting members 30 and 31. Thus, the two stators 14 and 15 are gradually brought into corresponding phase positions and the speed of operation is thereby automatically increased as the diameter of the cop increases. After the spindles 3 have been fully wound, the operation is discontinued, a suitable handle (not shown) is inserted into the recess 32 and the stator 15 is turned back to its initial position, as determined by the engagement of the floating nut 25 with the projecting portion 22 of the motor frame. Thus, it is evident that the stator 15 is always brought back to the same position before each cycle of operation is started and, therefore, a definite speed of operation is obtained for each cycle. If, for any reason, it is desired to alter the initial slow speed position, the floating nut 25 may be adjusted upon the shaft to secure the desired result, as will be readily understood.

The particular advantage in the adjustable stop resides in the fact that quick, accurate and simple adjustment may be effected, to conform to changeable weather conditions, to the particular physical properties of the yarn, or to differences in the electrical characteristics of the operating motors.

My invention is, of course, not restricted to use with spinning machinery alone, but may find various other commercial applications to other devices which are fed by means of a worm and gear mechanism.

While I have shown and described a device of a specific structure, and arrangement and location of parts, those skilled in the art will readily understand that many modifications may be effected therein, without departing from the spirit and scope of my invention, and I desire that only such limitations shall be imposed as are indicated in the appended claims.

I claim as my invention:

1. The combination with a rotatable member and means for effecting automatic operation thereof at a predetermined varying speed, of an adjustable means for fixing the initial speed of operation.

2. The combination with a rotatable member, means for operating the same, and automatic means for varying the speed of operation, of an adjustable stop for fixing the initial speed of operation.

3. The combination with a rotatable member, an electric motor for operating the same, and means dependent upon predetermined conditions for automatically varying the speed of operation, of means for restricting the starting speed to any predetermined value.

4. The combination with a rotatable member, an electric motor having a single rotor member and two relatively movable stator members, and means for automatically varying the relationship of said relatively movable stator members, of an adjustable means for restricting the initial relationship of said relatively movable stator members.

5. The combination with a drum shaft, an electric motor for driving said shaft, and means dependent upon predetermined conditions for gradually increasing the speed of said motor, of an adjustable means for limiting the initial speed of operation to a predetermined minimum value.

6. The combination with a drum shaft, a driving electric motor comprising a rotatable member and a plurality of relatively movable stator members, of a pawl and ratchet mechanism for intermittently varying the relative position of said stator members, and an adjustable means for limiting the relative movement of said stator members.

7. The combination with a rotatable drum, an operating induction motor comprising a plurality of primary members, one of which is rotatably movable through a wide arc, a secondary member disposed in inductive relation to said primary members, and mechanical means for varying the position of said movable primary member, of an adjustable means for limiting the movement of said primary member.

8. The combination with a rotatable drum, a driving electric motor comprising a rotatable secondary member, two primary stator members, one of which may be rotatively moved through a wide arc, a worm wheel segment secured to the movable primary member, a worm to engage said worm wheel segment, a shaft for said worm having a screw threaded portion, and means for automatically actuating said shaft, of a nut having notches in its periphery and adapted to float on the screw threaded portion of said shaft, and a locking pin secured to the motor frame and adapted to engage one of said notches.

9. The combination with a rotatable drum, a driving electric motor comprising a rotatable secondary member, two primary stator members, one of which may be rotatively moved through a wide arc, a worm wheel segment secured to the movable primary member, a worm to engage said worm wheel segment, a shaft for said worm having a screw threaded portion, and means for automatically actuating said shaft, of a traveling member located on the screw threaded portion of said shaft, and means for preventing said member from rotating.

10. The combination with a rotatable drum, a driving electric motor comprising a rotatable secondary member, two primary stator members, one of which may be rotatively moved through a wide arc, a worm wheel segment secured to the movable primary member, a worm to engage said worm wheel segment, a shaft for said worm, and means for automatically actuating said shaft, of means for limiting the movement of said shaft to a predetermined amount.

11. The combination with an electric motor comprising a rotatable secondary member and two relatively movable primary stator members, and gear mechanism operatively connected to the movable primary member, said mechanism comprising a rotatable shaft, having a screw threaded portion, of a nut adapted to float on said screw threaded portion and stationary means for engaging said nut.

12. The combination with an electric motor comprising a rotatable secondary member, two primary stator members, one of which may be rotatively moved through a wide arc, a worm wheel segment secured to the movable primary member, a worm to engage said segment, and a shaft for said worm having a screw threaded portion, of a nut having notches in its periphery and adapted to float on the screw threaded portion of said shaft, and a locking pin secured to the motor frame and adapted to engage one of said notches.

13. The combination with a drum shaft, means for operating said shaft and means for gradually and automatically varying the speed of said shaft, of an adjustable means for limiting the initial speed of said shaft to a predetermined minimum value.

In testimony whereof, I have hereunto subscribed my name this second day of March 1911.

ALBERT WALTON.

Witnesses:
E. C. MORSE,
C. C. PILSBURY.